(12) United States Patent
Ferrand

(10) Patent No.: US 11,895,423 B2
(45) Date of Patent: Feb. 6, 2024

(54) METHOD OF PRODUCING TRIGGERING SIGNALS FOR A CONTROL OF A MULTIMEDIA INTERFACE

(71) Applicant: STMicroelectronics (Rousset) SAS, Rousset (FR)

(72) Inventor: Olivier Ferrand, Carry le Rouet (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 18/187,335

(22) Filed: Mar. 21, 2023

(65) Prior Publication Data
US 2023/0224426 A1 Jul. 13, 2023

Related U.S. Application Data

(63) Continuation of application No. 16/669,951, filed on Oct. 31, 2019, now Pat. No. 11,637,947.

(30) Foreign Application Priority Data

Nov. 6, 2018 (FR) ...................................... 1860188

(51) Int. Cl.
| | |
|---|---|
| H04N 5/06 | (2006.01) |
| G09G 5/00 | (2006.01) |
| G06F 1/04 | (2006.01) |
| H04N 23/80 | (2023.01) |
| G06F 3/041 | (2006.01) |
| H04N 5/04 | (2006.01) |

(52) U.S. Cl.
CPC .................. *H04N 5/06* (2013.01); *G06F 1/04* (2013.01); *G09G 5/006* (2013.01); *H04N 23/80* (2023.01); *G06F 3/0416* (2013.01); *G09G 2310/08* (2013.01); *H04N 5/04* (2013.01)

(58) Field of Classification Search
CPC ........ H04N 5/06; H04N 5/04; H04N 5/23229; G09G 5/006; G09G 2310/08; G06F 1/04; G06F 3/0416
USPC .................. 713/400, 500, 501, 502; 348/500
See application file for complete search history.

(56) References Cited

U.S. PATENT DOCUMENTS

| 4,635,258 A | 1/1987 | Salowe |
| 5,206,768 A | 4/1993 | Fukada |

(Continued)

FOREIGN PATENT DOCUMENTS

| CN | 1831924 A | 9/2006 |
| CN | 101592976 A | 12/2009 |

(Continued)

OTHER PUBLICATIONS

Liu, Changdong, et al., "Multipoint Multimedia Teleconference System with Adaptive Synchronization", IEEE Journal on Selected Areas in Communications, vol. 14, No. 7, Sep. 1996, 14 pages.

*Primary Examiner* — Ji H Bae
(74) *Attorney, Agent, or Firm* — SLATER MATSIL, LLP

(57) ABSTRACT

A system includes an electronic module and an integrated circuit outside the electronic module. The integrated circuit is configured to generate a digital timing signal that emulates a first synchronization signal internal to the module and not available outside the module and to generate trigger signals based on the digital timing signal. A controller is configured to independently and autonomously perform control operations of the electronic module at times triggered by the trigger signals.

20 Claims, 6 Drawing Sheets

(56) References Cited

U.S. PATENT DOCUMENTS

| | | |
|---|---|---|
| 5,990,858 A | 11/1999 | Ozolins |
| 6,078,361 A | 6/2000 | Reddy |
| 6,369,856 B1 | 4/2002 | Jeong |
| 7,124,332 B2 | 10/2006 | Constantinescu |
| 7,659,874 B2 | 2/2010 | Koyama |
| 8,560,753 B1 | 10/2013 | Hobbs et al. |
| 9,298,556 B2 | 3/2016 | Mueller |
| 9,766,997 B2 | 9/2017 | Brandt |
| 10,123,385 B1 | 11/2018 | Chang |
| 10,592,322 B1 | 3/2020 | Seshadri et al. |
| 11,205,377 B2 | 12/2021 | Ferrand |
| 2001/0050724 A1 | 12/2001 | Kim |
| 2002/0144172 A1 | 10/2002 | Fayneh et al. |
| 2004/0234121 A1 | 11/2004 | Fujii et al. |
| 2006/0036893 A1 | 2/2006 | Anglin et al. |
| 2007/0013811 A1 | 1/2007 | Hsieh et al. |
| 2007/0266345 A1 | 11/2007 | Cok |
| 2008/0231749 A1 | 9/2008 | Asamura |
| 2011/0279424 A1 | 11/2011 | Lin et al. |
| 2012/0159259 A1 | 6/2012 | Klein et al. |
| 2012/0195503 A1 | 8/2012 | Kim et al. |
| 2013/0229421 A1 | 9/2013 | Cheng et al. |
| 2015/0033047 A1* | 1/2015 | Byun .............. G09G 5/36 713/320 |
| 2015/0058827 A1 | 2/2015 | Hanssen |
| 2015/0130824 A1* | 5/2015 | Lee ............... G09G 3/20 345/534 |
| 2016/0379559 A1 | 12/2016 | Yamaji |

FOREIGN PATENT DOCUMENTS

| | | |
|---|---|---|
| CN | 103219997 A | 7/2013 |
| JP | 2002229544 A | 8/2002 |
| JP | 2004266745 A | 9/2004 |
| JP | 2009116497 A | 5/2009 |
| JP | 2018045283 A | 3/2018 |
| KR | 20080067194 A | 7/2008 |
| KR | 20130066202 A | 6/2013 |
| TW | I620465 B | 4/2018 |
| WO | 2015058718 A1 | 4/2015 |

* cited by examiner

METHOD OF PRODUCING TRIGGERING SIGNALS FOR A CONTROL OF A MULTIMEDIA INTERFACE

CROSS-REFERENCE TO RELATED APPLICATIONS

This application is a continuation of U.S. application Ser. No. 16/669,951, filed on Oct. 31, 2019, which application claims priority to French Patent Application No. 1860188, filed on Nov. 6, 2018, which applications are hereby incorporated by reference herein in their entirety.

TECHNICAL FIELD

Modes of implementation and embodiments relate to a method of producing triggering signals for the control of a multimedia interface.

BACKGROUND

In general, synchronizations of software or hardware operations using an electronic module are performed statically with an interrupt signal generated by the module. The modules are not able to supply any interrupt signal.

In the example of a multimedia interface electronic module, an interrupt signal is generated once per image, typically when the multimedia interface processes a given line of an image frame.

As a result, there is typically just one synchronization point per frame (also denoted using the term "interrupt signal") that is made available by the image interface.

Now, as illustrated in FIG. 1 with reference to a display interface, software and hardware operations, executed or controlled by a computing unit, all depend on this single synchronization point TEi per frame ti (where 0≤i≤3 in FIG. 1). For example, these software and hardware operations typically involve reading touch coordinates, graphical digital processing, synchronization in a buffer memory, and other operations.

Typically, an operation of refreshing the display REF is executed at a time corresponding to an interrupt signal TEi. A graphical software operation GFX is conventionally executed at a time corresponding to an end of refresh signal EOR. Reading of touch coordinates TCT is conventionally executed at a time that itself also corresponds to an interrupt signal TEi.

Thus, in the case shown by FIG. 1, the graphical software operation GFX has been interrupted by the reading of touch coordinates TCT at the time of the interrupt signal TE1, and has not finished at the time of the following interrupt signal TE2. No operation of refreshing the display is executed at the time of the interrupt signal TE2, and the refresh operation resulting from the graphical task GFX is delayed until the next interrupt signal TE3.

In other words, FIG. 1 illustrates an example in which a single synchronization point per frame is insufficient, as multiple software and hardware operations would have to be able to be executed or activated several times during a given frame or over several frames.

Furthermore, in other scenarios, the interrupt signal, generated regularly by the multimedia interface, may reactivate (or "wake") the computing unit at inappropriate times. This introduces needless power consumption, which may be highly detrimental in systems with limited power resources.

Moreover, systems for controlling camera interfaces, which themselves also typically offer a single synchronization point per frame, generally require expensive hardware elements, for example, large buffer memories.

Specifically, a camera interface supplies an outgoing stream of image data, and, if the camera interface control receives the synchronization signal just once per frame, an entire frame of the outgoing stream has to be stored in a top-tier buffer memory upon each synchronization signal. This may represent a large amount of data and require a buffer memory with a high storage capacity, which is generally expensive.

From an overall point of view, the control of the multimedia interfaces is not optimized, due to constraints caused by the synchronization points generated by the multimedia interfaces. Moreover, it is desirable not to modify the generation of synchronization signals for existing multimedia interface technologies.

SUMMARY

Modes of implementation and embodiments relate to the generation of digital timing signals. Particular embodiments relate to generating trigger signals for externally controlling an electronic module.

Embodiments can exploit signals representative of the use or of the operation of an electronic module, not automatically available outside the module, for example, in the context of external control of the module.

Embodiments and modes of implementation propose a graphical timer that generates trigger signals allowing intelligent management of graphical events and making it possible to offer a solution for optimizing control of multimedia interface modules. Other embodiments can relate generally to electronic modules being able to have multiple synchronization signals, in a simple and versatile manner and without intervening on the modules as such.

According to one aspect, a method comprises generating, outside an electronic module, at least one digital timing signal emulating at least one first synchronization signal internal to the module and not available outside the module.

Emulating a signal is understood to mean reproducing or recreating this signal as it is or as how it should be, without actually having this signal.

For example, what is proposed is a solution that makes it possible to exploit a useful signal that is not initially available. The problems in terms of constraints of the synchronization points supplied by the electronic module are thus able to be solved.

According to one mode of implementation, the generation of the at least one timing signal comprises dividing the frequency of an elementary digital clock signal.

According to one mode of implementation, in the presence of a second synchronization signal coming from the module and available outside the module, the generation of the at least one timing signal emulating the at least one first signal uses the second signal.

For example, the generation of the at least one timing signal emulating the at least one first signal uses the second signal as elementary digital clock signal.

For example, the generation of the at least one timing signal emulating the at least one first signal uses the second signal to reset a phase of the timing signal resulting from the division of the frequency of the elementary digital clock signal.

Advantageously, the generation of the timing signals is able to be parameterized on the basis of inherent characteristics of the module. The method is thus able to adapt to various given technologies of the electronic module.

According to one mode of implementation, the method furthermore comprises creating trigger signals for externally controlling the module, comprising at least one count of edges of the timing signals, and generating the trigger signals in a manner conditional on the current values of the at least one count. The edges of the timing signals may be the rising edges of the digital signal or the falling edges of the digital signal.

Creating trigger signals thus makes it possible to have synchronization points different from those that are provided directly by the electronic module. Creating trigger signals is relevant to optimizing the use and the design of the control of the electronic modules, in particular the multimedia interfaces. The synchronization points may in particular be created so as to optimize control. Furthermore, as the trigger signals are generated internally, separately but on the basis of the synchronization signal coming from the electronic module, the method makes it possible to create various trigger signals in harmony with the electronic module without modifying it.

According to one mode of implementation, the at least one count of edges of the timing signals comprises several counts of edges of the timing signals, and the generation of the trigger signals comprises at least one generation of a complex trigger signal conditional on a combination of conditions regarding various current values of the counts.

The various counts make it possible to create trigger signals that are practical for uses or needs of the electronic module. Generating a complex trigger signal makes it possible for example to create trigger signals representative of events that are precisely conditioned in relation to the use or the needs of the electronic module.

According to one mode of implementation, the electronic module is a multimedia interface module, such as a display interface or a camera interface.

Specifically, even though the method according to this aspect is intended for any type of electronic module for which it is advantageous to exploit several synchronization points, it is particularly advantageous to exploit the method according to this aspect for multimedia interface modules, which are generally affected by sub-optimizations in this area.

For example, the at least one timing signal comprises a start of line signal emulating a horizontal synchronization signal of the multimedia interface module, and/or a start of frame signal emulating a vertical synchronization signal of the multimedia interface module.

The horizontal synchronization signal and vertical synchronization signal that are internal to the multimedia interface module have the advantage of being easily reproducible and representative of specific and usable events.

Advantageously, the method furthermore comprises monitoring a graphical task of the multimedia interface module, comprising waiting for the graphical task to be performed, timing the wait timed by at least one of the trigger signals, and at least one generation of a security signal if the timing of the wait has exceeded a reference value.

This mode of implementation makes it possible to take an additional and independent security measure. Specifically, the trigger signals thus generated independently (for example independently of an attached computing unit) make it possible to detect incorrect use of the multimedia interface, possibly due to a fault with a control of the multimedia interface. This may make it possible to avoid damage to certain multimedia interfaces.

What is also proposed, according to modes of implementation, is a method for controlling an electronic module, comprising a method such as defined above, the control method comprising control operations performed independently and autonomously at times respectively triggered by the trigger signals.

The trigger signals are thus generated in order to bring about the operations of controlling the multimedia interface so as to optimize the control, for example in relation to the hardware capabilities that the control has.

According to one mode of implementation in which the electronic module is a display interface module, the operations comprise at least one of the following operations: an operation of refreshing the display interface at a time controlled by a first trigger signal; a graphical computing operation at a time controlled by a second trigger signal; or an operation of reading touch coordinates from a touch controller at a time controlled by a third trigger signal.

Due to the fact that they are independent and autonomous as they are controlled by the trigger signals, these control operations, in contrast to the operations conventionally controlled by a single synchronization point, are not subject to possible mutual incompatibilities or interruptions. Of course, the creation of the trigger signals is configured so as to optimize the executions of the control operations.

According to one mode of implementation in which the electronic module is a camera interface module, the operations comprise transmitting an outgoing stream of image data at a time controlled by a first trigger signal or digitally processing a stream of image data, such as compressing the data, at a time controlled by a second trigger signal.

This may make it possible for example to perform preliminary processing of the outgoing stream of image data, for example compress the image data, on a just-in-time basis following the acquisition of images or of portions of images, so as to avoid the need to store a large amount of data in a buffer memory. In other words, an image of the stream of image data may be processed in portions and be discharged from the buffer memory in portions, in contrast to conventional processing in which each image is stored as a whole in the buffer memory.

According to another aspect, what is proposed is an integrated circuit, including a timing signal generator configured so as to generate, outside an electronic module, at least one digital timing signal emulating at least one first synchronization signal internal to the module and not available outside the module.

According to one embodiment, the timing signal generator comprises a frequency divider configured so as to divide the frequency of an elementary digital clock signal in order to generate the at least one timing signal.

According to one embodiment, in the presence of a second synchronization signal coming from the module and available outside the module, the timing signal generator is configured so as to generate the at least one timing signal emulating the at least one first signal using the second signal.

For example, the timing signal generator is configured so as to generate the at least one timing signal emulating the at least one first signal using the second signal as elementary digital clock signal.

For example, the timing signal generator is configured so as to generate the at least one timing signal emulating the at least one first signal using the second signal in order to reset a phase of the timing signal resulting from the division of the frequency of the elementary digital clock signal by the frequency divider.

Advantageously, the timing signal generator is able to be parameterized on the basis of inherent characteristics of the module.

According to one embodiment, the integrated circuit furthermore comprises a circuit for creating trigger signals for externally controlling the module, comprising at least one counting circuit configured so as to count edges of the timing signals, and a trigger signal generation circuit configured so as to generate the trigger signals in a manner conditional on the current values of the at least one counting circuit.

According to one embodiment, the at least one counting circuit comprises several counting circuits, and the trigger signal generation circuit is configured so as to generate at least one complex trigger signal in a manner conditional on a combination of conditions regarding various current values of the counting circuits.

According to one embodiment, the integrated circuit is configured for an electronic module that is a multimedia interface module, such as a display interface or a camera interface.

Advantageously, the timing signal generation circuit is configured so as to generate the timing signals comprising a start of line signal emulating a horizontal synchronization signal of the multimedia interface module, and/or a start of frame signal emulating a vertical synchronization signal of the multimedia interface module.

The integrated circuit may furthermore comprise a device for monitoring a graphical task of the multimedia interface module, configured so as to wait for the graphical task to be performed, time the wait in a manner timed by at least one of the trigger signals, and generate at least one security signal if the timing of the wait has exceeded a respective reference value.

The integrated circuit may be incorporated for example into a microcontroller or into a system-on-chip.

What is also proposed is a system for controlling an electronic module, comprising the electronic module and an integrated circuit such as defined above, the system comprising a computing unit configured so as to independently and autonomously perform control operations at times respectively triggered by the trigger signals.

For example, the electronic module is a display interface module and the computing unit is configured so as to perform at least one of the following control operations: an operation of refreshing the display interface at a time controlled by a first trigger signal; a graphical computing operation at a time controlled by a second trigger signal; or an operation of reading touch coordinates from a touch controller belonging to the system at a time controlled by a third trigger signal.

For example, the electronic module is a camera interface module and the computing unit is configured so as to perform an operation of transmitting an outgoing stream of image data at a time controlled by a first trigger signal or an operation of digitally processing a stream of image data, such as compressing the data, at a time controlled by a second trigger signal.

What is also proposed is an electronic apparatus, such as a smartwatch or a video camera, including a system such as defined above, or an integrated circuit such as defined above.

BRIEF DESCRIPTION OF THE DRAWINGS

Other advantages and features of the invention will become apparent on examining the detailed description of wholly non-limiting embodiments and modes of implementation, and the appended drawings in which.

DETAILED DESCRIPTION OF ILLUSTRATIVE EMBODIMENTS

Figure 2:
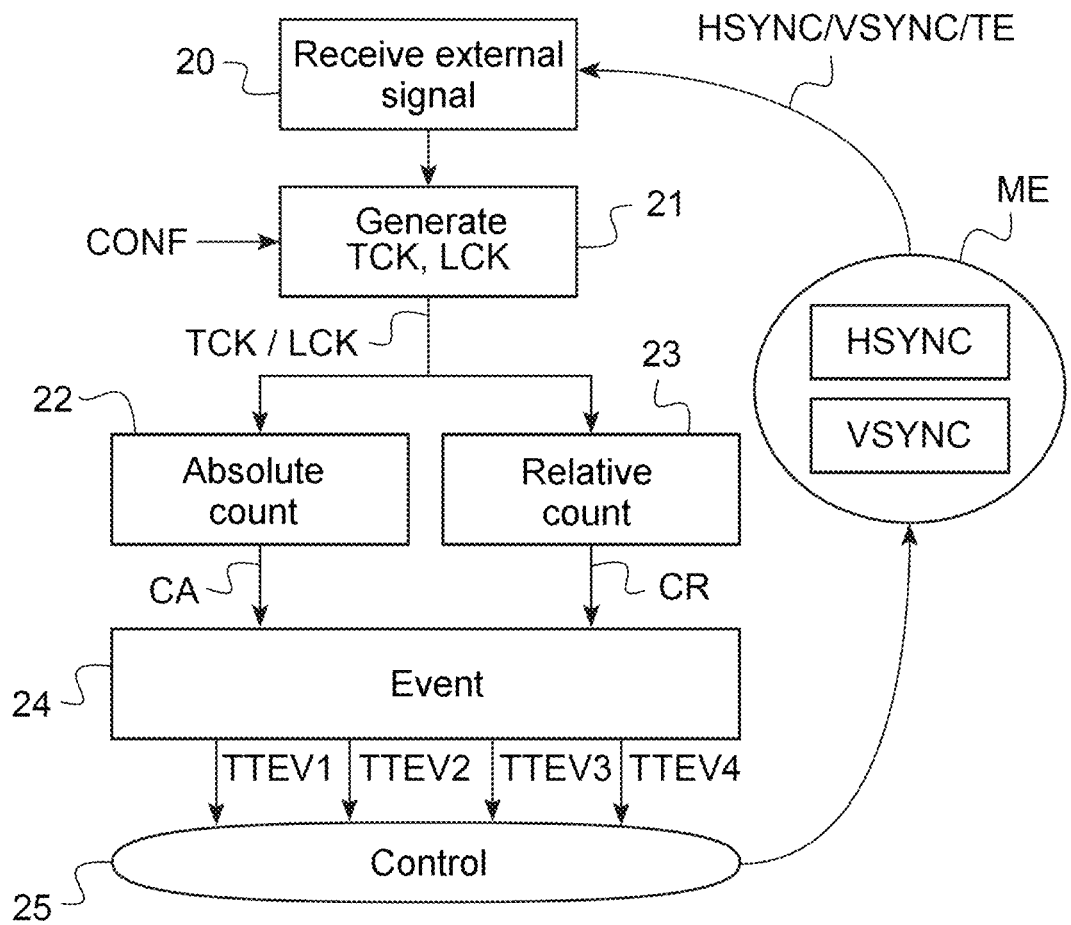
FIGS. 2 to 5 schematically illustrate various modes of implementation of the invention.

FIG. 2 shows an example of a method for creating trigger signals TTEVi ($1 \leq i \leq 4$) for controlling 25 an electronic module ME.

The method applies to controlling any type of electronic module for which several synchronization points may be desirable.

In particular, controlling multimedia interface electronic modules exhibits a significant requirement to be able to exploit several synchronization points. Reference will thus be made hereinafter to an electronic module of multimedia interface module type. Multimedia interface is understood to mean in particular display interfaces, for example TFT-LCD or AMOLED screens, and video image acquisition interfaces, of CCD or CMOS sensor type.

The method comprises generating 21 digital timing signals TCK, LCK emulating synchronization signals HSYNC, VSYNC internal to the module. The timing signals will be used as clock signals whose cycles will time incrementations or decrementations of counters.

The method thus comprises at least one count 22, 23 of rising or falling edges of the digital timing signals.

In this example, the at least one count of edges of the timing signals comprises a first count 22 of an absolute number CA of cycles of at least one of the timing signals TCK, LCK. The method according to this example also comprises a second count 23 of a relative number CR of cycles of at least one of the timing signals TCK, LCK.

Next, the trigger signals TTEVi are generated 24 in a manner conditional, that is to say when conditions are satisfied, on the current values of the counts 22, 23.

The digital timing signals TCK, LCK are generated so as to emulate synchronization signals internal to the electronic module ME, in order to be able to create the trigger signals that are optimized for a specific use of the module. The synchronization signals internal to the electronic module are generally not available outside the module, or at least not all available outside the module.

For example, in the case of a multimedia interface module, the digital timing signals TCK, LCK may emulate the horizontal synchronization signal HSYNC and vertical synchronization signal VSYNC of the multimedia interface module. These signals are representative of an image start of frame TCK (/VSYNC) and of a start of line LCK (/HSYNC) of a frame of the image, respectively.

In the context of multimedia interfaces, a very strict reproduction of the internal synchronization signals of the electronic module ME is not necessary, and not necessarily desirable.

That being the, it proves advantageous to avoid a phase offset between the timing signals and the actual state of the electronic module.

Now, the majority of multimedia interface modules ME aim to supply at least one synchronization signal TE with which the timing signals TCK, LCK are able to be put back into phase. Typically, at least one tearing effect signal TE (usually "TE" for "tearing effect") is communicated, generally once per frame, by the multimedia interface modules.

The abovementioned horizontal synchronization signal HSYNC and/or vertical synchronization signal VSYNC are also sometimes available. This is the case in particular when the multimedia interface is driven entirely by an attached device of microcontroller type.

Usually, multimedia interfaces make either the horizontal synchronization signal HSYNC and the vertical synchronization signal VSYNC or a tearing effect signal TE available outside the module.

The method is thus able to be implemented autonomously, independently of the electronic module ME, but may also comprise receiving a synchronization signal for synchronizing the timing signals TCK, LCK.

As a result, the method possibly comprises receiving 20 at least one synchronization signal VSYNC/HSYNC/TE internal to the electronic module ME and coming from the electronic module ME. In this case, the generation of the digital timing signals TCK, LCK then uses this at least one synchronization signal VSYNC/HSYNC/TE. In this respect, reference will be made to the description given hereinafter with reference to FIG. 7.

Of course, whether it is autonomous or uses a synchronization signal, the generation 21 of the timing signals TCK, LCK has to be adjusted to the inherent characteristics of the electronic module ME.

Thus, in order to be able to adapt to various electronic module ME technologies or configurations, the generation of the digital timing signals TCK, LCK is able to be controlled, by a control operation CONF, so as to be tailored to the reproduction of the given synchronization signals HSYNC, VSYNC internal to a given electronic module ME. For example, as the resolution of a display interface may vary from one device to another, the control operation CONF may make it possible to configure the counts in harmony with the inherent characteristics of the device.

The control operation CONF may be generated for example by a user implementing the method, or else by a manufacturer supplying the method.

The trigger signals TTEVi are generated 24 when conditions are satisfied regarding the current values CA, CR of the counts timed by these timing signals TCK, LCK.

For example, relatively simple conditions such as "reaching a number N of consecutive processed frames", or "reaching every 1/m portion of a frame", that is to say every L/m line of one and the same frame (where L is the number of lines per frame of an image of the multimedia interface IM and m is a positive integer lower than L), may make it possible to create useful trigger signals.

Thus, one example of generation conditional on an absolute count 22 may be expressed as follows: "for each frame, at the Mth line, generate a trigger signal TTEVi".

One example of generation conditional on a relative count 23 may be expressed as follows: "every K frames, generate a trigger signal TTEVi".

Furthermore, the generation 24 of the trigger signals TTEVi may comprise at least one generation of a complex trigger signal on the basis of a combination of various counts from among the counts 22, 23 of the timing signals TCK, LCK.

One example of generation of such a complex trigger signal may be expressed as follows: "every K frames, generate a trigger signal TTEVi at the Mth line of this frame".

Of course, the formulation examples of conditions for creating the trigger signals TTEVi on the basis of the timing signals TCK, LCK have been given above by way of illustration and without any limitation, and do not necessarily have a practical use. A person skilled in the art will know how to set conditions that meet his needs.

Figure 3:
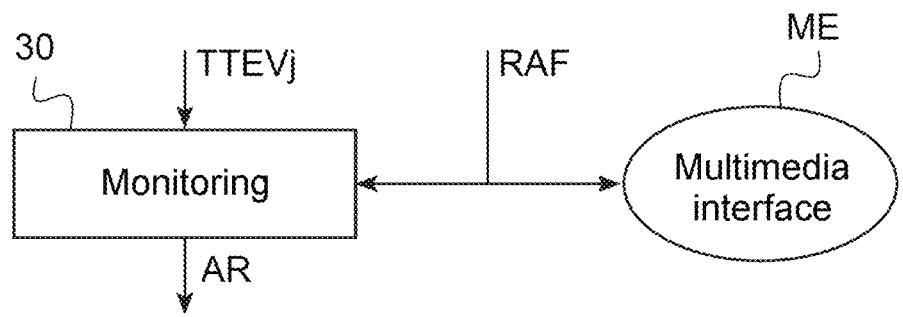

FIG. 3 shows an example of monitoring 30 a graphical task of a multimedia interface electronic module ME.

The monitoring comprises waiting for the graphical task RAF to be performed, and timing the wait timed by at least one of the trigger signals TTEVj.

At least one security signal AR is generated if the timing of the wait has exceeded a respective reference value.

This monitoring example makes it possible to take an additional and independent security measure, in particular independent of an attached microcontroller. Specifically, in particular when the multimedia interface module is an organic light-emitting diode "OLED" display, a lack of refreshing of the display for an excessively long time may irreversibly damage the OLED display interface.

Thus, in the example of an OLED display multimedia interface module, the event resulting from the graphical task RAF may advantageously comprise a signal representative of refreshing of the image.

The monitoring 30 of a graphical task of the multimedia interface module IM may nevertheless be of another type, and apply to other types of electronic module ME.

That being the, preferred modes of implementation of the monitoring 30 of a graphical task of the multimedia interface module ME are described in the French patent application 1860187 entitled "Procédé de surveillance d'une tâche, en particulier une tâche graphique, pour un module électronique, en particulier d'interface multimédia, et dispositif correspondant" ("Method for monitoring a task, in particular a graphical task, for an electronic module, in particular multimedia interface, and corresponding device"), filed in the name of the Applicant on the same day as the priority of the present patent application. This French patent application is hereby incorporated herein by reference, as is the U.S. counterpart application entitled Method of Monitoring a Task for an Electronic Module, which is being filed concurrently herewith.

Figure 4:
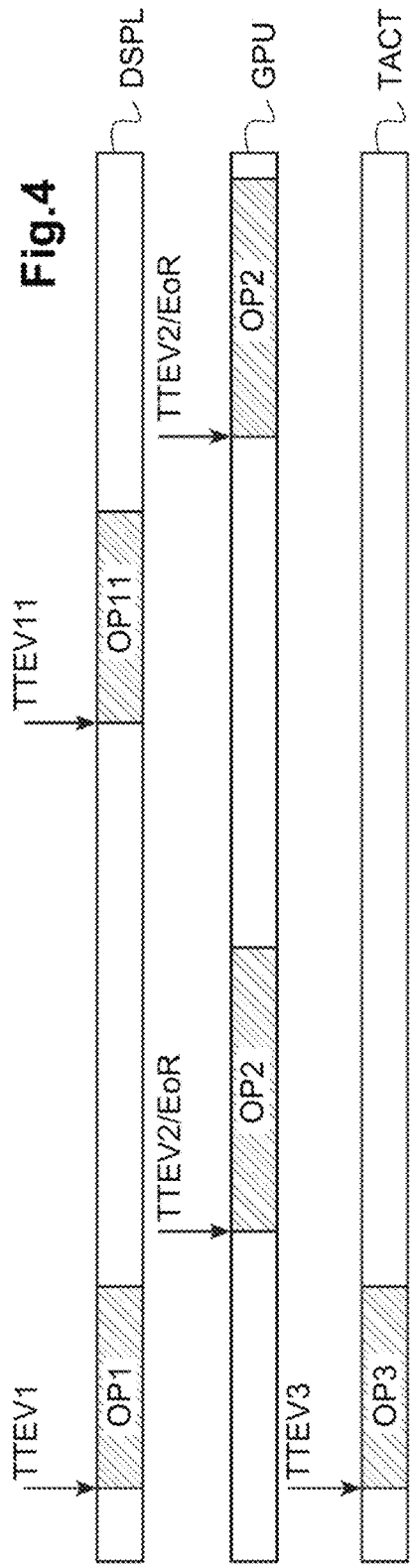

FIG. 4 shows one example of a method for controlling an electronic module.

The method for controlling the electronic module comprises a method for creating trigger signals TTEVi such as described above with reference to FIG. 2.

The method comprises control operations OPi ($1 \leq i \leq 3$) performed independently and autonomously at times respectively controlled by the trigger signals TTEVi ($1 \leq i \leq 3$ here).

In the example shown by FIG. 4, the electronic module is a display interface module DSPL, and the various operations OPi ($1 \leq i \leq 3$) comprise: an operation OPi of refreshing the display interface DSPL at a time controlled by a first trigger signal TTTEVi; a graphical computing operation OP2 at a time controlled by a second trigger signal TTEV2; or an operation OP3 of reading touch coordinates from a touch controller TACT at a time controlled by a third trigger signal TTEV3.

The graphical computing operation OP2 is possibly controlled by an end of refresh signal EoR, or the created second trigger signal TTEV2 so as to be generated at an equivalent time.

Figure 1:
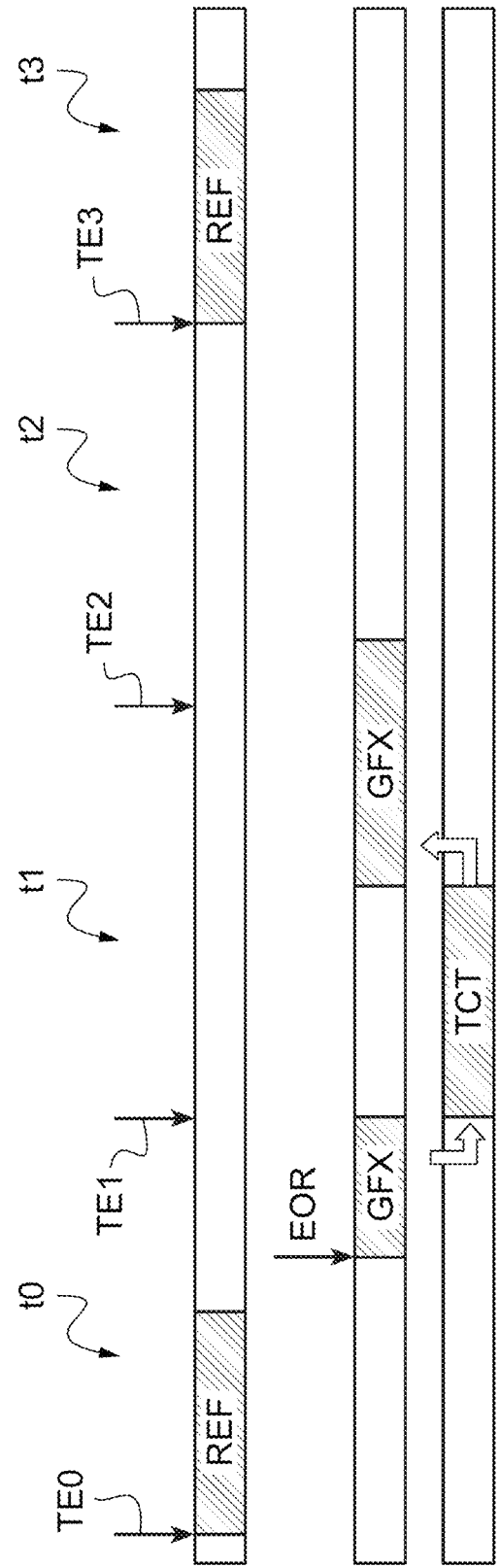
FIG. 1, described above, illustrates a conventional example of controlling a multimedia interface.

In the depiction of FIG. 4, possibly in comparison with FIG. 1 described above, it is possible to see, in this example, that the reading of touch coordinates OP3 has not introduced an interrupt for the graphical task OP2. The following refresh operation OP11 is thus not delayed and is able to be executed at the time of the next first trigger signal TTEV11.

Figure 5:
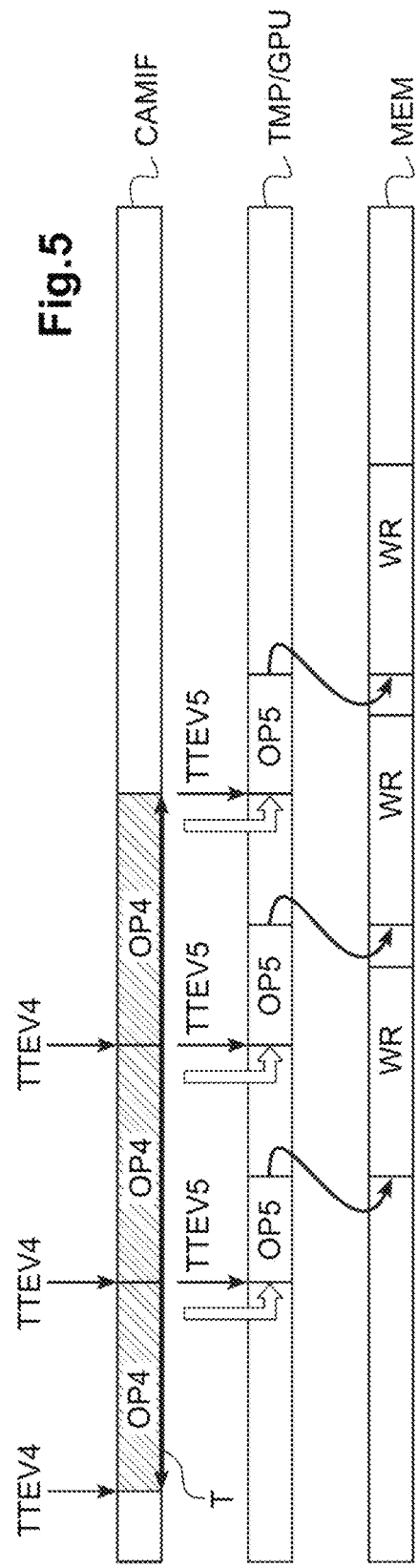

FIG. 5 also shows an example of a method for controlling an electronic module, comprising a method for creating trigger signals TTEVi such as described above with reference to FIG. 2, and control operations OPi (1≤i≤3) performed independently and autonomously at times respectively controlled by the trigger signals TTEVi (1≤i≤3 here).

In the example shown by FIG. 5, the electronic module is a camera interface module CAMIF, that is to say an interface for acquiring a stream of images, and the various operations OPi (1≤i≤3) comprise transmitting OP4 an outgoing stream of image data at a time controlled by a first trigger signal TTEV4 or digitally processing OP5 a stream of image data at a time controlled by a second trigger signal TTEV5.

In the example shown by FIG. 5, an entire image is acquired over the course of the shaded time T of the temporal block from the camera interface CAMIF. This example proposes to implement transmission of an outgoing stream of image data OP4 N times over the course of the acquisition of a complete image (N=3 in this example). Only 1/N of the volume of the image data is processed by a processing unit GPU at each digital processing operation OP5. During the digital processing operations OP5, the data are temporarily stored in a buffer memory TMP. For example, the digital processing operations OP5 may be of data formatting and compression type, or image processing of the type of transforming or improving rendering.

After each digital processing operation OP5, the processed data are written WR to a non-volatile memory MEM.

Thus, this example makes it possible to divide the size of the buffer memory TMP used in the digital processing operations OP5 by N.

Figure 6:
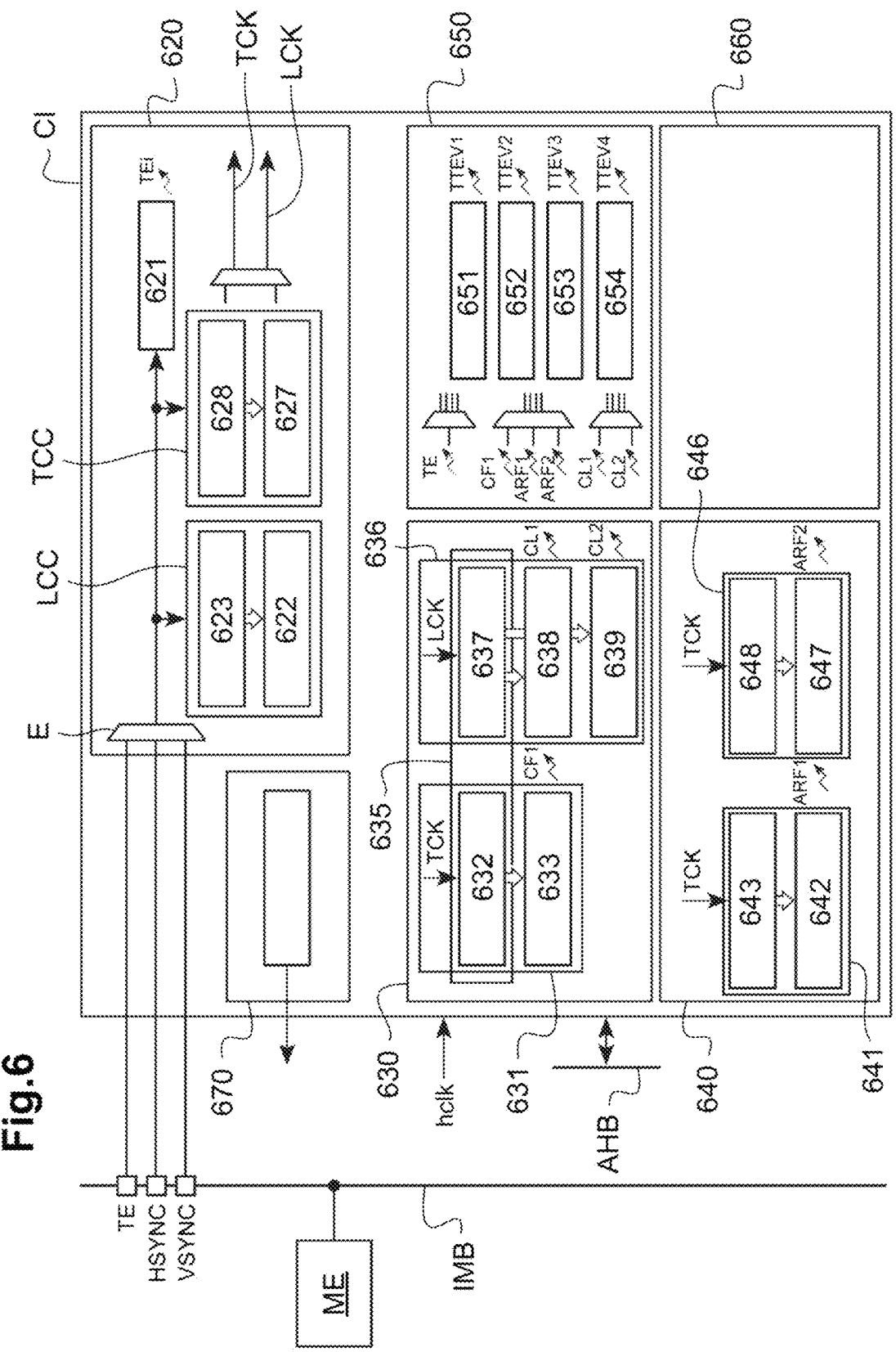
FIGS. 6 to 10 schematically illustrate embodiments of the invention.

FIG. 6 illustrates an example of an integrated circuit CI for creating trigger signals TTEVi (1≤i≤4) for controlling an electronic module ME. The integrated circuit CI may be incorporated for example into a microcontroller or into a system-on-chip.

The integrated circuit CI comprises a timing signal generation circuit 620, at least one counting circuit 630, 640 and a trigger signal generation circuit 650.

The timing signal generation circuit 620 is configured so as to generate digital timing signals TCK, LCK emulating synchronization signals HSYNC, VSYNC internal to the electronic module ME and not available outside the module ME.

A first counting circuit 630 is configured so as to count edges of the timing signals TCK, LCK in an absolute manner. A second counting circuit 640 is configured so as to count edges of the timing signals TCK, LCK in a relative manner. The trigger signal generation circuit 650 is configured so as to generate the trigger signals TTEVi (1≤i≤4) on the basis of respective events 65i (1≤i≤4) conditional on the current values of the counting circuits 630, 640.

In this example, the integrated circuit CI comprises an input E receiving at least one synchronization signal VSYNC, HSYNC, TE internal to the electronic module and coming from the electronic module ME and made available outside the module via a bus IMB. The timing signal generation circuit 620 may be configured so as to generate the digital timing signals TCK, LCK using the at least one synchronization signal VSYNC, HSYNC, TE. In this respect, reference will be made to the description given hereinafter with reference to FIG. 7.

For example, in the case of a multimedia interface module, the timing signal generation circuit 620 is configured so as to generate a start of line signal LCK emulating a horizontal synchronization signal HSYNC internal to the multimedia interface module and not available outside the module, and/or a start of frame signal TCK emulating a vertical synchronization signal VSYNC internal to the multimedia interface module and not available outside the module.

The start of line signal LCK and the start of frame signal TCK will be transmitted to the first absolute counting circuit 630 and to the second relative counting circuit 640 so as to time the counting elements. The current values of the counting circuits 630, 640 will be used by the trigger signal generation circuit 650 to test them for conditions 65i (1≤i≤4) representative of useful events.

In the example illustrated by FIG. 6, the first counting circuit 630 includes an absolute frame counter 631 and an absolute line counter 636.

The absolute frame counter 631 includes an ascending counter element 632 on 20 bits with free operation. The current value of the counter element 632 is incremented at each rising edge of the start of frame signal TCK.

A comparison value is recorded in a comparison register 633, also on 20 bits. An event CF1 is generated when the current value is equal to the comparison value.

The absolute line counter 636 includes an ascending counter element 637 on 12 bits with free operation. The current value of the counter element 637 is incremented at each rising edge of the start of line signal LCK.

Two comparison values are recorded in respective comparison registers 638, 639, also on 12 bits. Events CL1, CL2 are generated when the current value is equal to one of the comparison values.

The absolute counters 631, 636 may be controlled by conventional activation and reset signals that may come from hardware or software control elements. In the event of over-indexation of the field of the counters 632, 637, the absolute counters 631, 636 generate a flag signal intended for the control elements.

Furthermore, a value of the total absolute time on 32 bits may be read directly from a register 635 containing the 20 bits of the absolute frame counter 631 as most significant bits and the 12 bits of the absolute line counter 636 as least significant bits.

The various absolute counts of the first counting circuit 630 thus supply conditional signals CF1, CL1, CL2 for generating precise events TTEVi.

In the example illustrated by FIG. 6, the second counting circuit 640 includes two relative frame counters 641, 646.

The second relative counting circuit 640 makes it possible to generate periodic events for synchronizing the graphical tasks with conditions established with respect to the frames.

The relative frame counters 641, 646 include descending counter elements on 12 bits 642, 647 with automatic reloading. The counts of the counter elements 642, 647 are decremented at each rising edge of the start of frame signal TCK.

The starting values of the respective counts are loaded automatically from a respective automatic reload register AR 643, 648. When the respective counts are decremented to zero, the starting value is reloaded automatically and a respective end of countdown signal ARF1, ARF2 is generated.

The absolute counters 631, 636 may be controlled by conventional activation, wait and reset signals that may come from hardware or software control elements.

Moreover, the values of the instantaneous relative counts may be read from each frame counter 641, 646, directly from the register of the respective counter 642, 647.

The various signals resulting from the absolute counts CF1, CL1, CL2 and relative counts ARF1, ARF2 are used by the trigger signal generation circuit 650 to generate the trigger signals TTEVi ($1 \leq i \leq 4$) on the basis of respective events 65i ($1 \leq i \leq 4$) conditional on the signals CF1, CL1, CL2 ARF1, ARF2.

The trigger signal generation circuit 650 may be configured so as to generate at least one complex trigger signal TTEVi on the basis of an event conditional on a combination of conditions regarding the current values of the counting circuits.

The event generator may combine events regarding the various conditions CF1, CL1, CL2 ARF1, ARF2. For example, up to 4 events may be combined using conventional logic functions (AND, OR, NOT, etc.).

Moreover, the integrated circuit CI may include an input-output interface to a bus AHB of advanced microcontroller bus architecture type, in particular in order to communicate with a microcontroller or a graphics computing unit. For example, the trigger signals TTEVi may be communicated via the bus AHB. The integrated circuit may also typically include control and status registers 670, and a clock input hclk supplying the hardware frequency.

The synchronization signal generation circuit is advantageously able to be controlled in a configuration tailored to the reproduction of given synchronization signals (HSYNC, VSYNC), internal to a given electronic module, for example via a configuration coming from a microcontroller and transmitted on the bus AHB.

The bus AHB may preferably be of advanced peripheral bus architecture type, usually denoted using the acronym "APB" for the term "advanced peripheral bus".

This integrated circuit is particularly suitable for controlling a multimedia interface electronic module, such as a display interface or a camera interface.

Furthermore, the integrated circuit CI may comprise a device 660 for monitoring a graphical task of the multimedia interface module, advantageously an OLED display interface. In this respect, reference will be made to the description given hereinafter with reference to FIG. 8.

Figure 7:
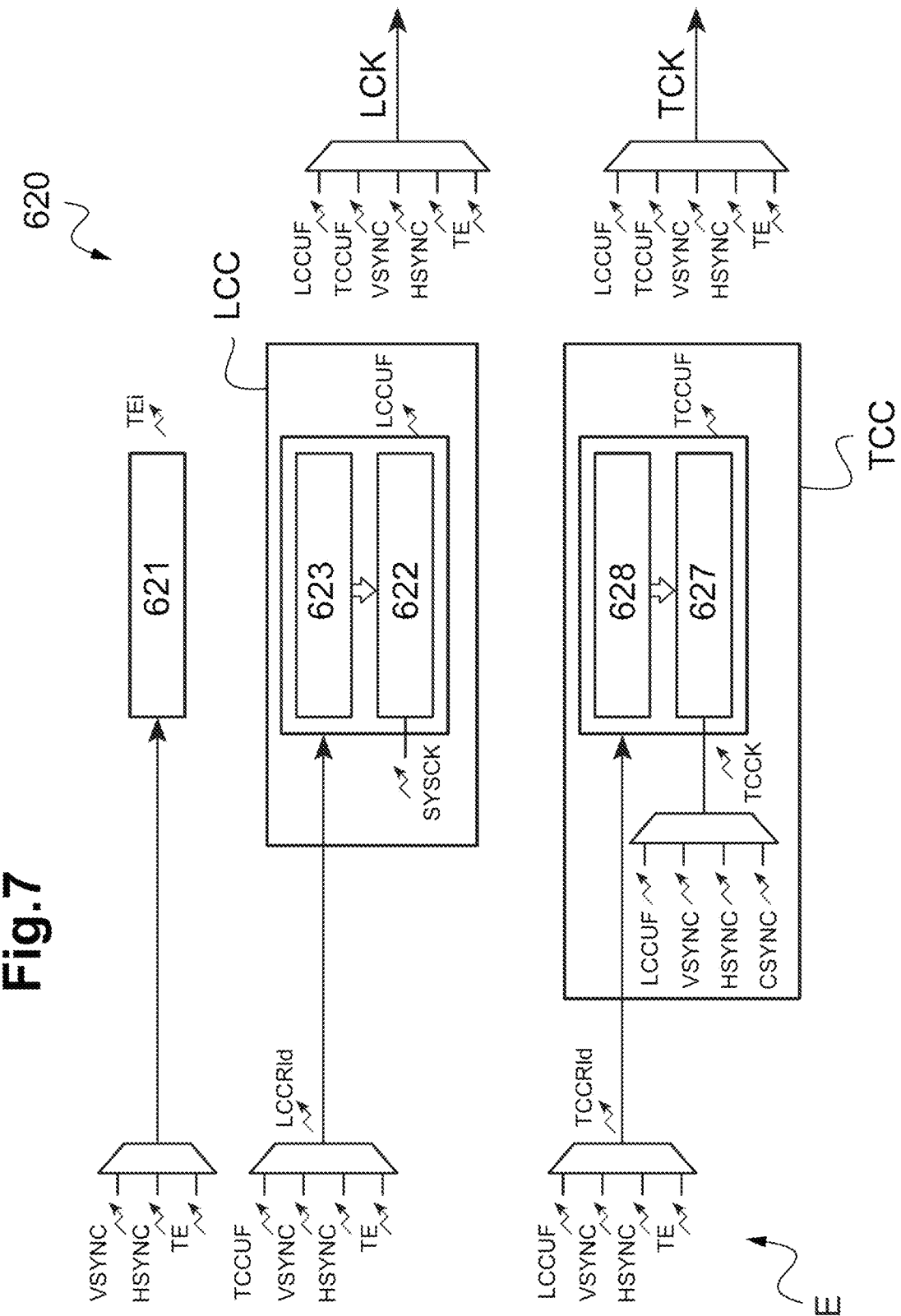

Reference is now made to FIG. 7 for discussing the generation of the digital timing signals TCK, LCK by way of the timing signal generation circuit 620.

The internal timing signal generation circuit 620 comprises a line counter LCC, a frame counter TCC, and a tearing effect signal TE detector 621.

The tearing effect signal detector 621 is configured so as to detect a tearing effect signal TE, for example by detecting a rising edge or a falling edge on the signal TE, depending on the polarity that is used, and to generate an internal digital signal TEi representative of this detection.

The line counter LCC includes a descending counter element 622 on 22 bits 622 with automatic reloading register 623. The current value of the counter element 622 is decremented at each rising edge of an internal clock signal SYSCK. The internal clock signal SYSCK is for example the clock signal hclk mentioned above with reference to FIG. 6.

The starting value of the counter is loaded automatically from an automatic reload register 623. When the current value is decremented to zero, the starting value is reloaded automatically and an end of decrement signal LCCUF is generated.

However, a forced reload signal LCCRld may make it possible to reload the counting element 622 to its starting value before it has reached zero, without generating the end of decrement signal LCCUF.

The starting value of the line counter LCC is chosen such that, at the frequency of the internal clock signal SYSCK, the countdown reaches zero (and generates a flag LCCUF) at the time of each start of line of the module.

The frame counter TCC includes a descending counter element 627 on 12 bits with automatic register reloading 628. The current value of the counter element 627 is decremented at each rising edge of a clock signal of the frame counter TCCK.

The starting value of the counter is loaded automatically from an automatic reload register 628. When the current value is decremented to zero, the starting value is reloaded automatically and an end of decrement signal TCCUF is generated.

However, a forced reload signal TCCRld may make it possible to reload the counting element 627 to its starting value before it has reached zero, without generating the end of decrement signal TCCUF.

The starting value of the frame counter TCC is chosen such that, timed by a signal representative of a start of line LCCK, the countdown reaches zero, and generates a flag TCCUF, at the time of each start of frame of the module.

It is recalled that, in the example of FIG. 6, the circuit CI comprises an input E intended to receive at least one synchronization signal VSYNC, HSYNC, TE internal to the electronic module and coming from the electronic module. Plus, the timing signal generation circuit 620 is configured so as to generate the digital timing signals TCK, LCK using the at least one synchronization signal VSYNC, HSYNC, TE.

In the context of an integrated circuit for creating trigger signals CI and designed to control a multimedia interface electronic module, such as a display interface or a camera interface, it is considered that the synchronization signals internal to the module and not available outside the module may be a vertical synchronization signal VSYNC or a horizontal synchronization signal HSYNC. An external synchronization signal TE of "tearing effect" type may possibly be available outside the module.

These synchronization signals will be denoted hereinafter directly using their references "VSYNC", "HSYNC".

That being the, the timing signal TCK, LCK generation circuit 620 may operate in various modes:
  in autonomous mode, with no synchronization signal available outside the module;
  with HSYNC and VSYNC available outside the module;
  with only HSYNC available outside the module;
  with only VSYNC available outside the module;
  with only CSYNC available outside the module (CSYNC=HSYNC+VSYNC).

All of the examples described below are given by way of reference, but other combinations may of course be contemplated.

In autonomous mode, the circuit 620 generates the digital timing signals TCK, LCK without any external signal.

The counter 622 is timed by the internal clock signal SYSCK and generates a flag LCCUF at the time of each start of line of the module. The flag LCCUF thus forms the start of line signal LCK emulating the signal HSYNC that is not available outside the module.

The flag LCCUF is used as clock signal TCCK for timing the counter element 627 of the frame counter TCC.

The counter 627 thus generates a flag TCCUF at the time of each start of frame of the module. The flag TCCUF thus forms the start of frame signal TCK emulating the signal VSYNC that is not available outside the module.

In the mode with HSYNC and VSYNC, the circuit 620 directly copies HSYNC as start of line signal LCK and VSYNC as start of frame signal TCK.

In the mode with only HSYNC, the circuit 620 generates the timing signals TCK, LCK using only the signal HSYNC.

The signal HSYNC is directly copied as start of line signal LCK.

The signal HSYNC is used as clock signal TCCK for timing the counter element 627 of the frame counter LCC. The flag TCCUF thus forms the start of frame signal TCK emulating the signal VSYNC that is not available outside the module.

In the mode with only VSYNC, the circuit 620 generates the timing signals TCK, LCK using only the signal VSYNC.

The signal VSYNC is directly copied as start of frame signal TCK.

The counter element 622 is timed by the internal clock signal SYSCK. The flag LCCUF thus forms the start of line signal LCK emulating the signal HSYNC that is not available outside the module.

The signal VSYNC is also used as forced reload signal LCCRId for the line counter LCC. The start of line signal LCK is thus resynchronized with each start of frame VSYNC.

In the mode with CSYNC only, the circuit 620 generates the timing signals TCK, LCK using only the signal CSYNC, the signal CSYNC being a signal comprising the sum of the two signals HSYNC and VSYNC. It is considered that the signal CSYNC is transmitted on the terminal "TE".

The counter 322 is timed by an internal clock signal SYSCK and generates a flag LCCUF when it reaches the end of its countdown (zero).

The signal CSYNC is used as forced reload signal LCCRId for the line counter LCC. The line counter is thus reloaded at each pulse of the component HSYNC of the signal CSYNC, and does not generate a flag LCCUF at these times.

However, the line counter LCC is not reloaded by the pulses of the component VSYNC of the signal CSYNC, as the component VSYNC does not vary over a duration longer than the counting of a line. During the pulse of the component VSYNC of the signal CSYNC, the line counter LCC then generates an end of decrementation flag signal LCCUF emulating a pulse of the signal HSYNC that is not available outside the module, and the signal CSYNC is directly copied as start of line signal LCK.

The flag LCCUF also forms the start of frame signal TCK emulating the signal VSYNC that is not available outside the module.

Figure 8:
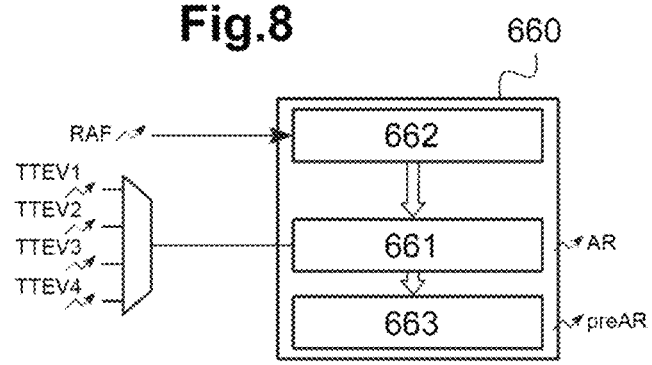

FIG. 8 illustrates an example of a device 660 for monitoring a graphical task RAF of a multimedia interface module ME.

The monitoring device 660 is configured so as to wait for the graphical task RAF to be performed, time the wait in a manner timed by at least one of the trigger signals TTEVi, and generate at least one security signal AR if the timing of the wait has exceeded a respective reference value.

In this respect, the monitoring device 660 includes a descending counter element on 16 bits 661 with automatic reloading 662. The current value of the counter element 661 is decremented in a manner timed by a dedicated trigger signal TTEVi.

The starting value of the counter is loaded automatically from an automatic reload register 662. When the current value is decremented to zero, the starting value is reloaded automatically and an end of decrement signal acting as security signal AR is generated.

However, a forced reload signal may make it possible to reload the counting element 661 to its starting value before it has reached zero, without generating the end of decrement signal AR. The signal RAF representative of the performance of the graphical task is used as forced reload signal.

The monitoring device may additionally include a comparator 663 configured so as to compare the current value of the counter element 661 with at least one other reference value recorded in a register. When the countdown reaches the at least one other reference value, at least one respective preliminary warning signal preAR is generated, for example in order to signal the approach of a hazardous situation.

The monitoring device 660 is particularly suitable when the multimedia interface module is an "OLED" display module having organic light-emitting diodes. Specifically, a lack of refreshing of the display for an excessively long time may irreversibly damage the OLED interface.

Thus, the event resulting from the graphical task may advantageously comprise a signal RAF representative of refreshing of the image.

Preferred embodiments of the device 660 for monitoring a graphical task of the multimedia interface module IM are described in the French patent application 1860187 entitled "Procédé de surveillance d'une tâche, en particulier une tâche graphique, pour un module électronique, en particulier d'interface multimedia, et dispositif correspondant" ("Method for monitoring a task, in particular a graphical task, for an electronic module, in particular multimedia interface, and corresponding device"), filed in the name of the Applicant on the same day as the priority of the present patent application.

Figure 9:
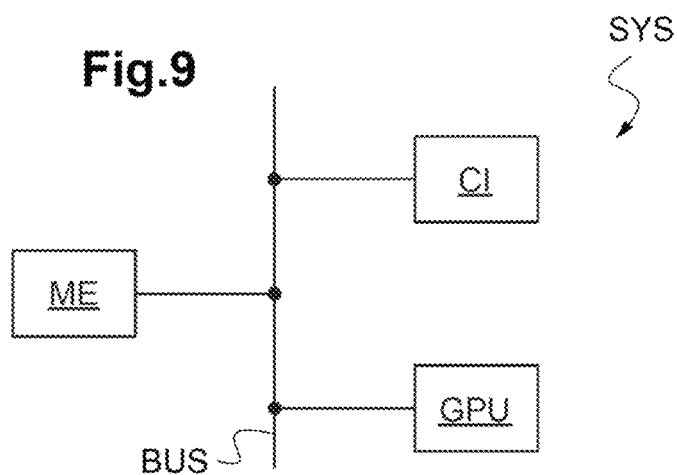

FIG. 9 shows a system for controlling an electronic module ME, comprising an electronic module ME such as a multimedia interface module IM, an integrated circuit CI for creating trigger signals of the type of integrated circuit described above with reference to FIGS. 6 to 8, and a computing unit GPU.

The multimedia interface module ME may be configured so as to supply at least one synchronization signal to the input of the integrated circuit CI for creating trigger signals, via a data bus BUS. In this depiction, the bus BUS may comprise the bus IMB and the bus AHB that were described above with reference to FIG. 7.

The computing unit GPU is configured so as to independently and autonomously perform control operations at times respectively controlled by the trigger signals.

Reference is again made to FIG. 5, in this case in relation to the system SYS, in which the electronic module ME is a display interface module DSPL.

The computing unit GPU is configured so as to perform at least one of the following control operations:
  operations OP1, OP11 of refreshing the display interface DSPL at times controlled by respective first trigger signals TTEV1, TTEV11;
  a graphical computing operation OP2 at a time controlled by a second trigger signal TTEV2;
  an operation OP3 of reading touch coordinates from a touch controller TACT belonging to the system at a time controlled by a third trigger signal TTEV3.

Reference is now made to FIG. 6, in this case in relation to the system SYS, in which the electronic module ME is a camera interface module CAMIF.

The computing unit GPU is configured so as to perform at least one of the following graphical operations:
  an operation OP4 of transmitting an outgoing stream of image data at a time controlled by a first trigger signal TTEV4;
  an operation OP5 of digitally processing a stream of image data, such as compressing the data, at a time controlled by a second trigger signal TTEV5.

Figure 10:
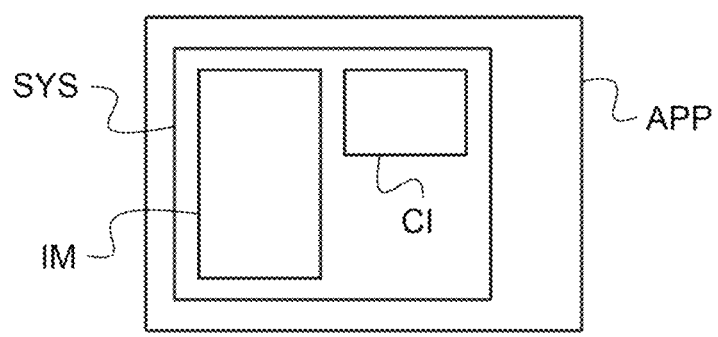

FIG. 10 shows an electronic apparatus APP, such as a smartwatch, a smartphone or a video camera. The electronic apparatus APP includes a system SYS such as described above with reference to FIG. 9. The system SYS thus includes in particular an integrated circuit CI for generating trigger signals, for example incorporated into a system-on-chip equipped in particular with a computing unit, for example in the form of a microcontroller, as well as a multimedia interface IM, such as a display or a camera sensor.

Moreover, the invention is not limited to these embodiments, but incorporates all variants thereof; for example, it is reiterated, even though the example of a multimedia interface module has been emphasized, that the embodiments and modes of implementation apply to the control of any type of electronic module that may have several synchronization points.

The invention also incorporates a method comprising generating, outside an electronic module ME, at least one digital timing signal LCK, TCK emulating at least one first synchronization signal HSYNC, VSYNC internal to the module and not available outside the module as such. A corresponding integrated circuit is described above with reference to FIG. 7 according to one particular embodiment.

The generation of the at least one timing signal LCK, TCK may comprise dividing the frequency of an elementary digital clock signal SYSCK, TCCK. Of course, the generation of the timing signals TCK, LCK may be able to be parameterized on the basis of inherent characteristics of the module ME. In the presence of a second synchronization signal HSYNC, VSYNC, TE coming from the module and available outside the module, the generation of the at least one timing signal LCK, TCK emulating the at least one first signal may advantageously use the second signal. For example, the second signal HSYNC is used as elementary digital clock signal TCCK, or else the second signal VSYNC is used to reset a phase of the timing signal resulting from the frequency-divided elementary digital clock signal SYSCK.

What is claimed is:

1. An integrated circuit to be coupled to an electronic circuit, the integrated circuit comprising:
   a timing signal generator comprising:
      a tearing effect signal detector circuit configured to generate a first signal in response to detecting a first synchronization signal internal to the electronic circuit and available outside the electronic circuit,
      a line counter circuit configured to generate, outside the electronic circuit, a second signal emulating a horizontal synchronization signal internal to the electronic circuit and not available outside the electronic circuit, and
      a frame counter circuit configured to generate, outside the electronic circuit, a third signal emulating a vertical synchronization signal internal to the electronic circuit and not available outside the electronic circuit;
   a trigger circuit configured to generate trigger signals for externally controlling the electronic circuit, the trigger circuit comprising a counter configured to count edges of the second signal or the third signal; and
   a trigger signal generation circuit configured to generate second trigger signals based on current values of the counter.

2. The integrated circuit of claim 1, wherein the tearing effect signal detector circuit is configured to detect the first synchronization signal by detecting a rising edge or a falling edge of the first synchronization signal.

3. The integrated circuit of claim 2, wherein a determination to use the rising edge or the falling edge of the first synchronization signal is made based on a polarity of the first synchronization signal.

4. The integrated circuit of claim 1, wherein the timing signal generator comprises a frequency divider configured to divide a frequency of the first synchronization signal to generate the second signal or the third signal.

5. The integrated circuit of claim 4, wherein the second signal or the third signal is generated using the first synchronization signal to reset a phase of, respectively, the second signal or the third signal resulting from dividing the frequency of the first synchronization signal by the frequency divider.

6. The integrated circuit of claim 1, wherein the integrated circuit is part of a multimedia interface circuit comprising a second circuit that monitors a graphical task, the integrated circuit configured to wait for the graphical task to be performed, time the wait in a manner timed by at least one of the trigger signals, and generate a security signal in response to the timing of the wait exceeding a respective reference value.

7. The integrated circuit of claim 1, wherein the integrated circuit is coupled to a controller configured to independently and autonomously perform control operations of the electronic circuit at times triggered by the trigger signals.

8. A method, comprising:
   generating, by an integrated circuit coupled to an electronic circuit, a first signal in response to detecting a first synchronization signal internal to the electronic circuit and available outside the electronic circuit,
   generating, by the integrated circuit, outside the electronic circuit, a second signal emulating a horizontal synchronization signal internal to the electronic circuit and not available outside the electronic circuit, and
   generating, by the integrated circuit, outside the electronic circuit, a third signal emulating a vertical synchronization signal internal to the electronic circuit and not available outside the electronic circuit;
   generating, by a trigger circuit of the integrated circuit, trigger signals for externally controlling the electronic circuit, the trigger circuit comprising a counter configured to count edges of the second signal or the third signal; and
   generating, by the integrated circuit, second trigger signals based on current values of the counter.

9. The method of claim 8, further comprising detecting the first synchronization signal by detecting a rising edge or a falling edge of the first synchronization signal.

10. The method of claim 9, wherein a determination to use the rising edge or the falling edge of the first synchronization signal is made based on a polarity of the first synchronization signal.

11. The method of claim 8, further comprising dividing, by a frequency divider of the integrated circuit, a frequency of the first synchronization signal to generate the second signal or the third signal.

12. The method of claim 11, wherein the second signal or the third signal is generated using the first synchronization signal to reset a phase of, respectively, the second signal or the third signal resulting from dividing the frequency of the first synchronization signal by the frequency divider.

13. The method of claim 8, wherein the integrated circuit is part of a multimedia interface circuit comprising a second circuit that monitors a graphical task, the method further comprising waiting, by the integrated circuit, for the graphical task to be performed, timing the wait in a manner timed by at least one of the trigger signals, and generating a security signal in response to the timing of the wait exceeding a respective reference value.

14. The method of claim 8, wherein the integrated circuit is coupled to a controller, the method further comprising independently and autonomously performing, by the controller, control operations of the electronic circuit at times triggered by the trigger signals.

15. A system, comprising:
an electronic circuit;
an integrated circuit coupled to the electronic circuit, the integrated circuit comprising a timing signal generator and a trigger circuit, the trigger circuit configured to generate trigger signals for externally controlling the electronic circuit, the timing signal generator comprising:
  a tearing effect signal detector circuit configured to generate a first signal in response to detecting a first synchronization signal internal to the electronic circuit and available outside the electronic circuit,
  a line counter circuit configured to generate, outside the electronic circuit, a second signal emulating a horizontal synchronization signal internal to the electronic circuit and not available outside the electronic circuit, and
  a frame counter circuit configured to generate, outside the electronic circuit, a third signal emulating a vertical synchronization signal internal to the electronic circuit and not available outside the electronic circuit; and
a controller configured to independently and autonomously control operations of the electronic circuit at times triggered by the trigger signals.

16. The system of claim 15, wherein the tearing effect signal detector circuit is configured to detect the first synchronization signal by detecting a rising edge or a falling edge of the first synchronization signal.

17. The system of claim 16, wherein a determination to use the rising edge or the falling edge of the first synchronization signal is made based on a polarity of the first synchronization signal.

18. The system of claim 15, wherein the timing signal generator comprises a frequency divider configured to divide a frequency of the first synchronization signal to generate the second signal or the third signal.

19. The system of claim 18, wherein the second signal or the third signal is generated using the first synchronization signal to reset a phase of, respectively, the second signal or the third signal resulting from dividing the frequency of the first synchronization signal by the frequency divider.

20. The system of claim 15, wherein the integrated circuit is part of a multimedia interface circuit comprising a second circuit that monitors a graphical task, the integrated circuit configured to wait for the graphical task to be performed, time the wait in a manner timed by at least one of the trigger signals, and generate a security signal in response to the timing of the wait exceeding a respective reference value.

* * * * *